(12) United States Patent
Basheer et al.

(10) Patent No.: US 8,180,474 B2
(45) Date of Patent: May 15, 2012

(54) SYSTEM AND METHOD FOR CERTIFIED GARMENT DESIGN

(75) Inventors: Bruce S Basheer, Liscannor (IE); John Patrick McHugh, Malahide (IE); John David McHugh, Cliffoney (IE); Tara Baoth Mooney, Rossnowlagh (IE)

(73) Assignee: Brandvis R&D Limited, Donegal (IE)

( * ) Notice: Subject to any disclaimer, the term of this patent is extended or adjusted under 35 U.S.C. 154(b) by 698 days.

(21) Appl. No.: 12/209,992

(22) Filed: Sep. 12, 2008

(65) Prior Publication Data

US 2009/0248193 A1 Oct. 1, 2009

(30) Foreign Application Priority Data

Mar. 27, 2008 (IE) .................................. S2008/0225

(51) Int. Cl.
 *G06F 19/00* (2006.01)
(52) U.S. Cl. ....................................................... 700/132

(58) Field of Classification Search ........... 700/130–133
See application file for complete search history.

(56) References Cited

U.S. PATENT DOCUMENTS

| 5,530,652 A * | 6/1996 | Croyle et al. ................. 700/130 |
| 6,473,671 B1 * | 10/2002 | Yan ................................ 700/134 |
| 6,925,350 B2 * | 8/2005 | Watanabe ..................... 700/132 |
| 2002/0186865 A1 * | 12/2002 | Retterath et al. ............. 382/104 |

FOREIGN PATENT DOCUMENTS

EP    1550381 A1 *  7/2005

* cited by examiner

*Primary Examiner* — Nathan Durham
(74) *Attorney, Agent, or Firm* — Aeon Law; Adam L. K. Philipp

(57) ABSTRACT

There is provided a method for designing a garment having a particular certification based on the visibility characteristics of the garment. The method takes into account various factors including manufacturing tolerances, occlusion by logos, etc. to calculate a certification level for the garment visibility. This certification level is calculated dynamically as the design features are amended.

9 Claims, 3 Drawing Sheets

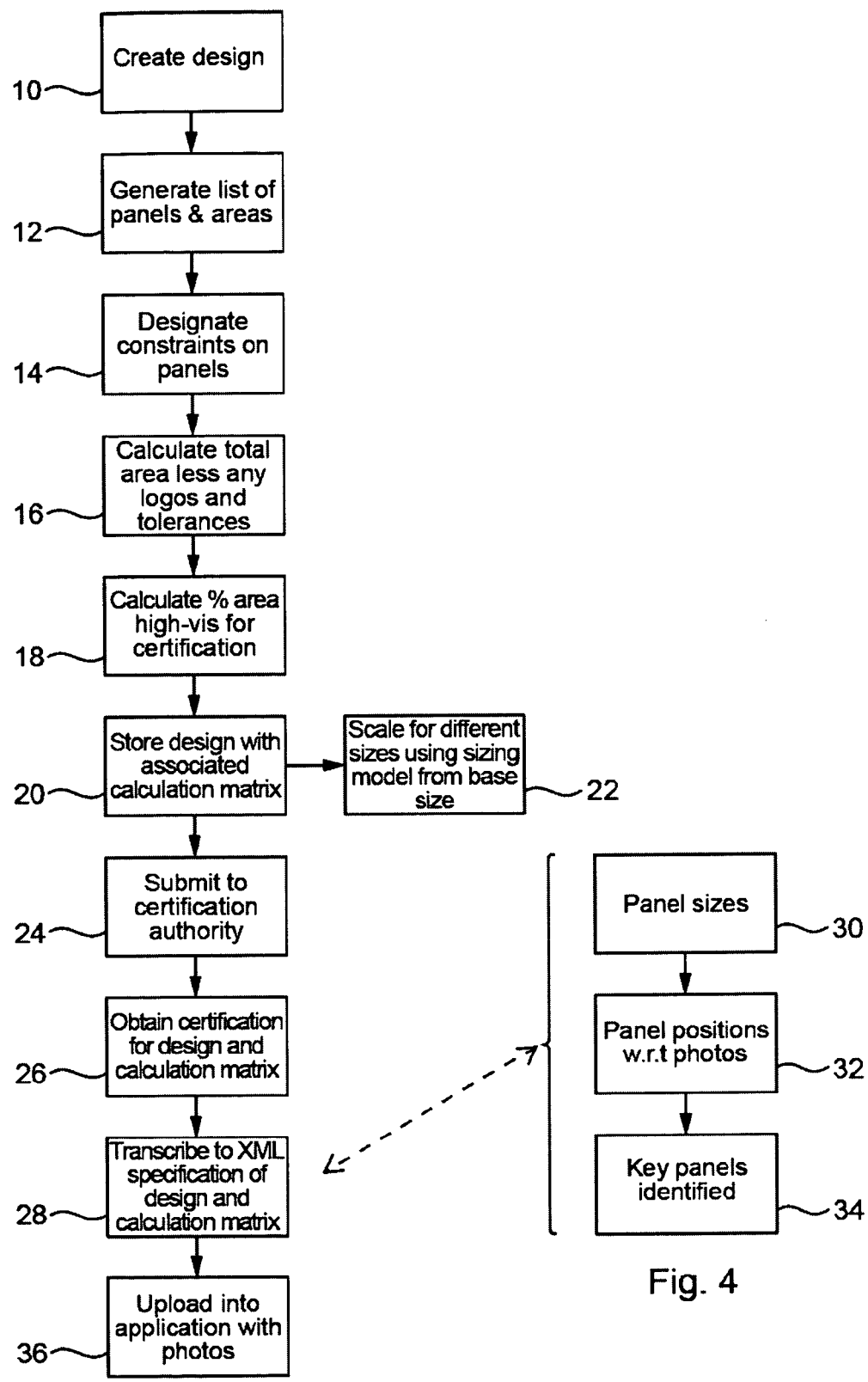

SYSTEM AND METHOD FOR CERTIFIED GARMENT DESIGN

FIELD

This invention relates to a system and method for garment design, in particular a system and method for the design of a safety garment requiring certification from an appropriate standards authority.

BACKGROUND

In certain sectors of the workforce, employees are often required to wear clothing having a high visibility, to increase the awareness of persons around them to their presence. Examples of such sectors include areas exposed to a relatively high degree of hazardous vehicular traffic, e.g. road construction or maintenance, police officials, emergency personnel.

This is normally accomplished through the use of high-visibility ("Hi-Vis") jackets, having a mixture of retroreflective tape areas (these being the highest reflectivity material shaving the ability to return a substantial portion of incident light in the direction of origination of the light, used in reflective armbands and the like), high visibility fabric panels (such as fluorescent yellow and orange fabrics used in safety vests) and lower visibility panels which do not contribute to the calculated reflectivity under the regulatory standards.

Various standards exist in order to classify the effectiveness of such high visibility clothing. In Europe, the EN 471 standard dictates the various levels of classification for personal protective equipment (PPE) clothing, while the publication ANSI/ISEA 107 entitled "American National Standard for High-Visibility Safety Apparel" provides similar levels of classification in the USA. EN 471 sets the minimum area of retroreflective material and background fluorescent material (e.g. high visibility orange or yellow) required for each classification, from class 1 (most lenient) to class 3 (most stringent, and therefore highest visibility level). Table 1 below lists the requirements for the different EN 471 classes.

TABLE 1

| EN 471 Classification, expressed in cm squared | | |
|---|---|---|
| EN 471 Class | Minimum background fluorescent material ($cm^2$) | Minimum retroreflective material/tape ($cm^2$) |
| Class 1 | 1400 | 1000 |
| Class 2 | 5000 | 1300 |
| Class 3 | 8000 | 2000 |

The use of PPE classification systems such as EN 471 and ANSI/ISEA 107-1999 provides for agreed standards that can be employed to meet health and safety requirements in various industries. Traditionally, suppliers provide ready-made garments derived from a design that has been determined to fit into one of the prescribed classifications. However, such classifications are rigorously determined, and any subsequent addition of logos or crests result in an alteration of the design, as some of the retroreflective material of the garment may be obscured by the addition. Correspondingly, the previously-prescribed classification may no longer be valid.

In recent times, there has been increased use of mass customisation techniques, particularly in the field of garment design. Mass customisation allows for a user to employ a computer-based system to take a basic template design and create custom garments, e.g. sportswear having company-specific branding and colour scheme. Through the use of a software program, e.g. a Java applet on a website, a user can alter each of the features of their design until they produce a garment design that is acceptable to the user's requirements. However, the importance of classification systems for PPE garments results in a degree of inflexibility when such garment design is implemented in known mass customisation systems.

As is well known in the art, the conventional process of providing a certified garment begins with a designer creating a design for a garment. The shape of the garment is created by designing a number of flat panels, often with curved edges such that, when sewn together during garment assembly, a 3-dimensional shape is created by virtue of the shapes and sizes of the individual flat fabric panels making up the garment.

The design process, therefore, requires firstly, that a pattern is created, specifying the shape of each piece for a given garment size. Since a high visibility garment usually involves a number of different fabrics (colours, materials, reflectivity levels), the pieces are grouped by fabric, so that all pieces using the same material and colour are grouped together. Each group of pieces is then arranged in what is known as a "cut-make-trim" or CMT arrangement, i.e. a layout allowing the fabric pieces to be cut from a length of fabric with maximum efficiency, taking account of tolerances, the direction of weave or pattern (if any) for each piece, and so on.

When the CMT pattern has been specified for each fabric used in the design, a calculation is performed to determine, for each fabric, the overall area of that fabric used in the CMT layout, less tolerances and any assigned logo area. The design is locked at this point and the CMT and accompanying calculations are then sent to a certification body which certifies the CMT design.

Once the CMT design is certified it cannot be changed. A company offering "customised" apparel to customers will in reality offer a range of approved designs, each having its own certification (achieved in the manner outlined above) and will allow customisation by application of a logo in the place provided by a place holder Such services do not enable a customer to change the colour of various panels as this would invalidate the certification and require a new CMT to be prepared, based on the new mix of fabrics, and for this CMT design to be sent for independent certification.

A problem associated with this system however is the fact that each different design must be independently certified. Should a user want a design which is different to one of the pre-certified templates, then this will be a new design not benefiting from the certification of earlier designs, and therefore the user will not know for certain what the final classification of their design will be until after the design has been finalised and submitted for certification.

This system impedes the process of iterative design of the safety garment, as a number of different designs may have to be made into finalised prototypes which then undergo the standard certification procedure. This results in considerable delays (from a couple of weeks to several months) between iterations, and can be extremely frustrating if a single piece of the design has to be altered, which results in the new design requiring a completely new certification. Such an exercise is not suitable for providing an automated design system with acceptably quick turnaround of the user's design ideas.

SUMMARY OF THE INVENTION

There is provided a method for enabling a user of a computer program to design a garment having certification based on the visibility characteristics of the garment, the method comprising the steps of:

(a) storing in memory a garment pattern, said garment pattern comprising a plurality of individual panels which when assembled together contribute to an overall garment, each panel having an associated area;

(b) generating a set of calculation rules associated with said garment pattern, said set of calculation rules operable to calculate a certification level for said garment pattern based on at least the area of each panel and a value for a visibility characteristic chosen for said panel;

(c) providing to said user a selection control which is operable to select a fabric or colour selection for one or more of said panels, said fabric or colour selection determining a visibility value for said panel in said calculation rules;

(d) calculating a certification level for said garment pattern using said set of calculation rules and said fabric or colour selection; and (e) generating a finalised garment pattern having associated therewith said certification level.

The use of this method allows for a garment design to be customised and produced having a certification level based on the visibility characteristics of the garment, without requiring iterative design choices to be independently certified. This method is especially suited for use in automated design systems, and provides an efficient and customisable design process for a user.

Preferably, step (d) further comprises the step of presenting the calculated certification level to said user.

Preferably, the method comprises repeating steps (c) and (d) until a certification level desired by a user is obtained for said designed garment pattern.

Preferably, further comprising operating the selection control to adjust the area associated with one or more of said panels, and wherein said calculating step (d) is based on the adjusted area selection.

Preferably, step (c) further comprises the step of providing to said user an indicia control which is operable to select indicia to be displayed on at least one of said panels, and wherein said calculating step (d) is based on the area associated with said panels less the area of said panels obscured by said indicia.

Preferably, said set of calculation rules are based on the area of each panel less manufacturing tolerances.

Such manufacturing tolerances may be for example reductions in the visible area of a panel due to cutting and sewing imperfections and material consumed by seams, etc. Accounting for these tolerances allows for the actual area of the panels that are visible in the finished garment to be calculated when determining the certificate level, resulting in an accurate certification level. Preferably, the method further comprises the following step:

(f) storing in memory said finalised garment pattern.

Preferably, said method comprises designating at least one first panel of said plurality of individual panels as linked to at least one second panel of said plurality of individual panels, and wherein a user selection made to either said first panel or said second panel causes a corresponding selection applied to the other linked panel.

There is also provided a computer program product stored on a computer readable medium comprising a set of instructions which, when executed on a computer, are operable to implement the steps of the method as outlined above.

According to a further aspect, there is provided a high-visibility garment designed according to the invention.

BRIEF DESCRIPTION OF THE DRAWINGS

An embodiment of the invention will now be described, by way of example only, with reference to the accompanying drawings in which:

FIG. 3 is a flowchart of a process for creating a design template having high visibility certification;

FIG. 4 is a flowchart of the steps involved in specifying a design in an XML format;

DESCRIPTION

Figure 1:
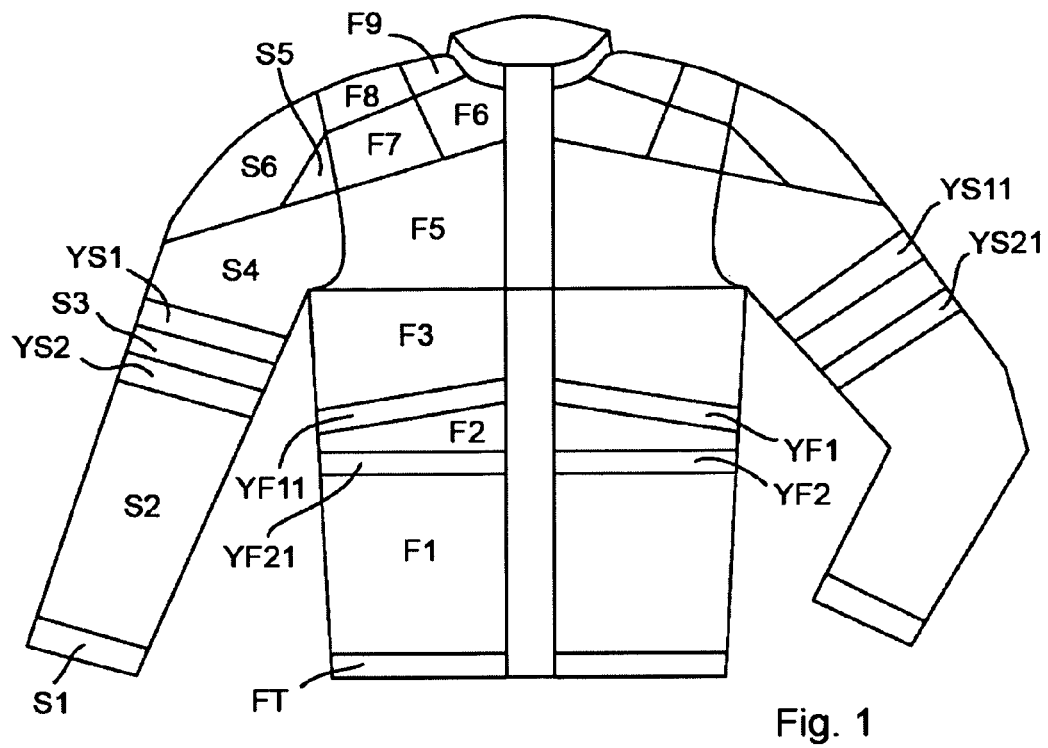
FIG. 1 is a front view of a sample garment design in terms of its constituent panels.
Figure 2:
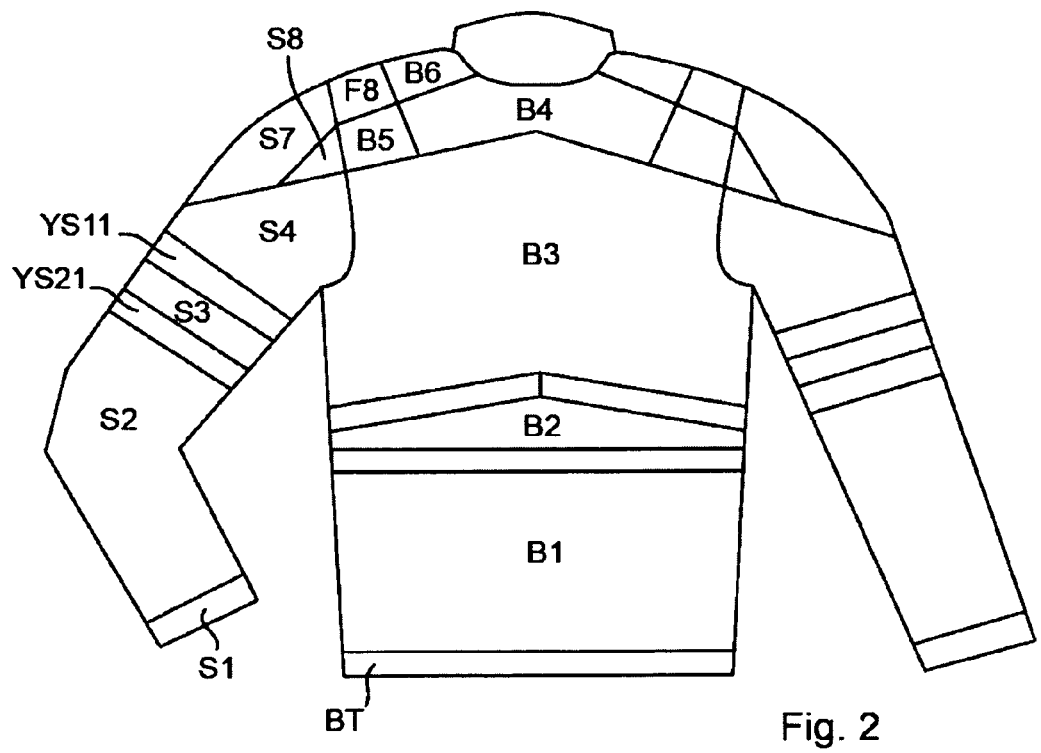
FIG. 2 is a rear view of the sample garment of FIG. 1.

FIG. 1 shows a front view of a garment design, broken down into the constituent fabric panels making up the design. FIG. 2 is a rear view of the same garment design. Each panel has an alphanumeric identifier (e.g. B2, F3, YS1). These identifiers each include one of the letters B, F and S, respectively denoting that the panel is located on the back, front or sleeve of the jacket. Additionally, certain panels which are to be made of a highly retroreflective material have the prefix "Y", such as a retroreflective sleeve panel YS1.

In order to ensure that garments made according to this pattern can be certified, some basic constraints must be met, including the dimensions and material for the retroreflective tapes having a "Y" prefix. Therefore, in the discussion which follows, such panels are not included in any of the user-configurable items. In order to provide a design which can be certified, depending on the user's choices, in Class 1, 2 or 3 (see Table 1), the designer simply fixes the retroreflective tape area to meet the most stringent standard.

In alternative embodiments, the tape widths etc. could be user-adjustable, with the dynamic calculation process described below adapted to additionally classify the design based on the user's choices for the retroreflective tapes. However, as this makes it more difficult for both the system designer and for the user to achieve certification in any desired class, it is preferred to set the tape dimensions and positions as fixed elements of the design meeting the requirements for the most stringent class.

A further constraint on this garment design is that the major lower band of the sleeves (S2) and the jacket body (F1 & B1) must be in a single colour. The small band between the generally horizontal retroreflective tapes on the sleeves (S3) and body (F2 & B2) must also be in a single colour, though optionally this latter colour can be a different colour to that chosen for S2, F1 & B1).

The design of FIGS. 1 and 2 will be used for illustrative purposes in the following description of a process for creating and certifying a design template.

In FIG. 3, a process is illustrated for creating a design template having high visibility certification. In step 10, a designer creates a design for a high visibility garment, such as the design shown in FIGS. 1 and 2. Typically, a designer will start with a basic, standard garment design shape and will modify this design to achieve the shape and appearance desired. In the discussion which follows, consideration will be given only to the visible external appearance of the garment, but obviously a designer will be concerned with other design features, such as linings, padding, pockets, stitching details, etc.

The design created by the designer is made of a plurality of panels of fabric to be sewn or otherwise bonded together, as described above. When the shapes and sizes of these panels have been finalised, a listing is created in step 12 indicating the area of the panel. An example of such a listing is given below in Table 2.

TABLE 2

Panel colour constraints and surface areas

| Panel ID | Fixed colour group | Area (cm$^2$) | No. of instances of panel | Total Area for panels (cm$^2$) | Percentage of garment area |
|---|---|---|---|---|---|
| B1 | A | 1079.8 | 1 | 1079.80 | 8.82% |
| B2 | B | 460.26 | 1 | 460.26 | 3.76% |
| B3 |   | 1203.84 | 1 | 1203.84 | 9.84% |
| B4 |   | 292.39 | 1 | 292.39 | 2.39% |
| B5 |   | 63.07 | 2 | 126.15 | 1.03% |
| B6 |   | 75.15 | 2 | 150.29 | 1.23% |
| B8 |   | 52.85 | 2 | 105.70 | 0.86% |
| BT |   | 383.66 | 1 | 383.66 | 3.13% |
| F1 | A | 533.93 | 2 | 1067.87 | 8.72% |
| F2 | B | 234.45 | 2 | 468.89 | 3.83% |
| F3 |   | 92.93 | 2 | 185.86 | 1.52% |
| F5 |   | 514.63 | 2 | 1029.26 | 8.41% |
| F6 |   | 105.15 | 2 | 210.30 | 1.72% |
| F7 |   | 66.02 | 2 | 132.04 | 1.08% |
| F8 |   | 46.71 | 2 | 93.43 | 0.76% |
| F9 |   | 46.43 | 2 | 92.87 | 0.76% |
| FT |   | 191.81 | 2 | 383.62 | 3.13% |
| S1 |   | 275.1 | 2 | 550.19 | 4.50% |
| S2 | A | 920.68 | 2 | 1841.37 | 15.04% |
| S3 | B | 303.29 | 2 | 606.58 | 4.96% |
| S4 |   | 662.98 | 2 | 1325.95 | 10.83% |
| S5 |   | 31.54 | 2 | 63.08 | 0.52% |
| S6 |   | 75.38 | 2 | 150.76 | 1.23% |
| S7 |   | 84.66 | 2 | 169.31 | 1.38% |
| S8 |   | 33.12 | 2 | 66.23 | 0.54% |
| Total |   |   |   | 12240 | 100% |

As shown in Table 2, panels constrained to have a common colour are denoted in the second column ("Fixed Colour Group") by a letter (A or B) or if there is no such constraint, the column is blank (step 14 of FIG. 3).

The third column ("Area (cm$^2$)") shows the area of the individual panel. If there are two such panels (for example the sleeve panel S2 occurs in two places, once on each arm), this is noted in the fourth column ("No. of instances of panel") and then the fifth column ("Total Area for panels (cm$^2$)") shows the total area attributable to all instances of that panel shape (i.e. the product of columns 2 and 3).

At the bottom of the fifth column, the relevant external surface area of the garment available for high visibility fabric to be applied, is found as the aggregate sum of the panel areas. (Note that this figure ignores the retroreflective tape areas, since certification against EN:471 has two independent surface area criteria: a minimum area of high visibility fabric and, independently of that area, a minimum area of retroreflective fabric or tape.)

The final column ("Percentage of garment area") shows what percentage of the overall external area of the garment is attributable to each panel (or, for panels occurring in multiple instances such as S2, what percentage is attributable to all such panels in the garment).

Now if one considers the nominal external visible surface area (12240 cm squared), it can be seen from Tables 1 and 2 that Class 1 certification requires 1,400 cm squared or 11.44% of the area of the jacket (again ignoring the retroreflective tapes area) to be in high visibility material.

Class 2 certification requires 5,000 cm squared, or 40.85% of the external panels to be in high visibility material.

Class 3 certification requires 8,000 cm squared or 65.36% of the external panels to be in high visibility material.

These figures are true at a first approximation, but a jacket constructed to these constraints might nevertheless fail certification due to the presence of logos, or due to the inaccuracies inevitably brought about by manufacturing inaccuracies, even where these are within the specified tolerances.

Referring back to FIG. 3, the next step, therefore, is to make allowances for the area attributable to logos and other indicia, which will detract from the overall garment surface available for certification purposes. In other words, the EN-471 classification of Table 1 specifies the required area of background fluorescent (also referred to herein as "high visibility") material, but certification may be impacted if the logos and other indicia happen to appear on panels specified as being of high visibility materials.

In order to grant the user with maximum freedom in customising the garment, the designer specifies the number and maximum size of logos, which the user may then position on any panel (other than on retroreflective tapes). To compensate for the possibility of the logos covering high visibility fabric, the worst case scenario is catered for. The way this is done is to assume that every part of every logo covers some high-visibility fabric. If this were the case, then each square centimeter of logo would require an additional square centimeter of high visibility fabric, over and above the notional minimum required for a given Class of certification to still meet that Class.

For example, for a jacket to meet Class 3 of EN-471, there must be, inter alia, 8000 cm squared of high visibility fabric. If a jacket were designed to meet this standard exactly, but then a large logo (area=500 cm squared) was placed on the jacket, this would mean that the jacket's high-visibility area would reduce to as little as 7500 cm squared. If however the jacket were designed so that it had a high visibility area of 8500 cm squared, then a logo of 500 cm squared could be accommodated anywhere on the jacket (other than on the tapes) without bringing the visible area of high visibility fabric below 8000 cm squared.

This concept is used in step 16 of FIG. 3 to add a further constraint to the design. Continuing with the example of Table 2, if the designer wishes to cater for a front logo, a rear logo, and an ID holder to hold the wearer's identification pass, then the following assumptions might be made:

TABLE 3

Logo & other indicia areas

| Item | Area (cm$^2$) | No. of instances | Total Area for panels (cm$^2$) | Percentage of garment area |
|---|---|---|---|---|
| ID Holder | 47 | 1 | 47 | 0.38% |
| Front logo | 56 | 1 | 56 | 0.46% |
| Back logo | 340 | 1 | 340 | 2.78% |
| Total |   |   | 443 | 3.62% |

Accordingly, there must be an additional area of high visibility fabric, amounting to 3.62% of the relevant external surface area, to ensure that the logos and ID holder can be placed anywhere on the panels without affecting certification.

Then, as also indicated in step 16, a similar exercise is carried out to take account of the manufacturing tolerances: suppose that each panel is not cut and sewn to its ideal area, but rather is at the lower limit of the tolerances specified for that panel in the designer's original specification. How does one compensate for this possibility and ensure certification? The solution is to assume each panel is affected to the maximum adverse degree, i.e. the maximum amount of high visibility fabric is assumed to be lost. One can then construct a table, based on Table 2 above, which calculates for each panel the amount of the overall surface area lost in this way.

For example, Panel B1 has a nominal surface area of 1079.8 cm squared. The minimum possible visible area for this panel in a finished jacket, while remaining within tolerance, is 1046.97 cm squared. The potential "lost" area, therefore, is 32.83 cm squared. This amounts to about 0.268% of the total external surface area of the jacket in Table 2 above (ignoring again the area of retroreflective tape).

If one repeats the same calculations for each panel in the jacket, one arrives at a figure for the potential reduction in surface area due to manufacturing inaccuracies, and this figure is 3.795 in the sample jacket design under consideration.

Taking account of the figures arrived at above, therefore, certification of the jacket to Classes 1, 2 and 3 of EN-471, with absolute certainty that the minimum standards are met in all cases, will require that, as shown in Table 4, the following amount of high visibility fabric is used in each case:

TABLE 4

Minimum high-visibility fabric calculation for compliance of jacket with EN-471

|  | Class 3 | Class 2 | Class 1 |
| --- | --- | --- | --- |
| High-visibility fabric (nominal) | 65.36% | 40.85% | 11.44% |
| Extra high-visibility fabric to take logo into consideration | 3.62% | 3.62% | 3.62% |
| Extra high-visibility fabric for tolerance safety | 3.80% | 3.80% | 3.80% |
| Total high-visibility fabric as percentage of external area | 73% | 49% | 19% |

The figures in the bottom row of Table 4 are thus the crucial figures (see step 18, FIG. 3). If the jacket design shown in FIGS. 1 and 2 is constructed with a sufficient area of panels in high-visibility fabric to exceed the relevant total, then the jacket can be certified in that Class under EN-471.

The next step in the design and certification process of FIG. 3, therefore, is to store the design and the calculation matrix (which includes the data of Table 2 and the thresholds of Table 4 in a calculable format), step 20.

This design can then be scaled for different sizes. The panel sizes actually listed in Table 2 are for a small size jacket. Standard sizing charts are used to scale the jacket up to larger sizes. If a jacket is designed with a sufficient number of high visibility panels for the small size to exhibit (say) 8000 cm squared of high-vis fabric, then the larger sizes will have proportionately more high-vis fabric (since each panel in high-vis fabric is that much bigger), and thus one can be assured that the larger sizes jackets made in identical fabrics to those chosen for the small size, will exceed the certification level met by the smallest jacket. Accordingly, the larger sizes are designed, step 22, but not needed for the further discussion of certification (though they will of course be used when a user's order is taken and that order includes varying sizes of jacket).

The finished design template (i.e. the design pattern and the calculation matrix) are then submitted to a certification authority, step 24. In traditional certification, the authority considers the colour and material of each panel, and decides if the relevant standard has been met for the overall garment. From that point on the design is "locked". Any changes to fabric, logo placement and size, etc., will result in a different design requiring re-certification.

In contrast, the certification authority in the present case is asked to certify that the design pattern, as set out in the data of Table 2 and the calculations resulting in the figures of Table 4, is accurate. The authority is further asked to certify that the rules and constraints (placement of tapes, locking of associated panels to a single colour), when combined with a sufficient number of fabric panels to result in (say) 73% or 49% or 19% high-visibility material, will guarantee that the resultant garment exceeds Class 3, 2 or 1 respectively.

The certification received for the design is therefore not for a garment design per se, but rather is for a design template and a set of rules to be implemented in software. When combined with certification that the software itself will implement the rules correctly, one can obtain certification of a design template and its associated calculation matrix, step 26.

Then, the design template and the approved calculation matrix are transcribed to an XML (extensible mark-up language) specification, step 28. As indicated in FIG. 4, this involves specifying the panels in terms of their sizes, step 30, their positions with respect to a photo or a visual model of the garment (i.e. a model with which the user can interact to change the fabric for a given panel, with the position of the panel being linked to the XML data for that panel), step 32, and in terms of identifying key panels and constraints (e.g. panels which are unalterable, panels which are in more than one position, so that changing the left sleeve, say, results in a change in the equivalent right sleeve panel, and panels which are in a single colour group as shown in Table 2), step 34.

Finally, the XML file is uploaded into the back end of a web application along with the photos or the models mentioned earlier, step 36.

This web application is designed to allow a user to customise the design to a far greater extent than would conventionally be allowed for a certified design. The operation of the web application is illustrated in FIG. 5.

The application begins by loading the models or photos of a number of available designs. When a user accesses the application by logging into a site or by accessing a site, for example, a web page is presented which will typically have an interactive element embedded in it or linked from it, such as an interactive Shockwave, Flash or Java application, and this will display a number of such photos or models of garments (or indeed a list of categories or of garment names).

Figures 5, 6:
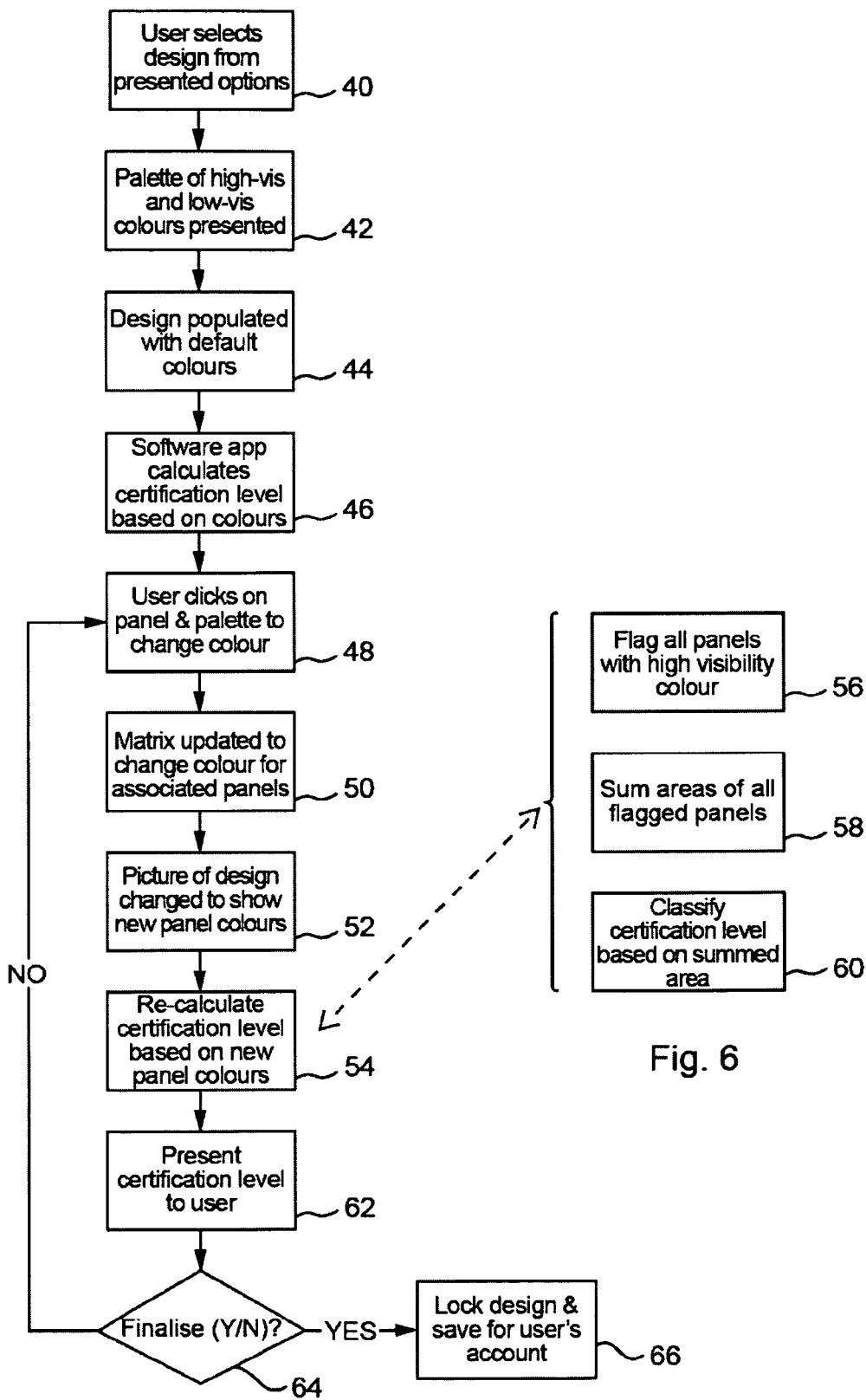
FIG. 5 is a flowchart of the certification of a user's design based on the modification of the design template.
FIG. 6 is a flowchart of the steps involved in the dynamic re-calculation of a certification level.

In FIG. 5, step 40, a user selects a design from the options presented. This causes the application to load the template and calculation matrix in the background, and to present to the user a palette of available fabrics or colours, step 42. Typically, the designer will have provided default colours or fabrics for the garment template, and the design will typically be populated with these choices, step 44.

Based on these choices, the certification module of the software will perform an initial calculation of the certification level of the garment when designed with these colours, step 46. The certification determination will be described below with reference to FIG. 6.

The user can interact with the presented visual model or photo by selecting a panel and choosing a colour for that panel from the palette, step 48. Because the XML data file for this design template includes a cross reference between the data for each panel and the position of that panel in the model, that data matrix can be updated to change the default colour to the new selected colour. Every panel which is associated with the selected panel and required to have the same colour is simultaneously changed, step 50.

The resulting changes in the XML data file are fed back to the visual model, and all associated panels are re-drawn with the newly selected colour, step 52. Meanwhile, the certification level of the garment is updated, step 54, as will be explained with reference to FIG. 6.

The certification module of the software notes, for each panel in the garment, the current colour or fabric. Each colour or fabric which is high visibility or fluorescent (within the meaning of the standard EN-471, for example) is flagged as such, step 56, and when a change is made in the XML data file, the colours and flagged panels are updated. The software continually, periodically, or on instruction (e.g. when a change is made by the user) calculates the summed area of all panels flagged with high visibility colours, step 58, by summing the percentage equivalent figures (taken from the rightmost column of Table 2).

Based on this total percentage area in high-visibility colours, the certification module of the software determines the band in which the result lies, and returns the corresponding certification level:

| | |
|---|---|
| Uncertified: | result < 19% |
| Class 1: 19%≦ | result < 49% |
| Class 2: 49%≦ | result < 73% |
| Class 3: 73%≦ | result |

Because the software has been certified and the thresholds have been certified against the design, taking manufacturing tolerances and logo placement into account, the result can be relied on as a certification of the user's customisation of the design without having to re-certify with the authority.

The returned certification level is presented on-screen to the user, step 62 of FIG. 5. It will be appreciated from the user viewpoint that this all happens instantaneously, i.e. the user clicks on a panel and a colour and the model is instantly updated on-screen with an indication of the current certification level. A user can thus play around with colours and logo positions until he or she is satisfied with the appearance of the design and the indicated certification level, as indicated by the decision branch at step 64. If the user does not finalise the design at step 64, i.e. the user makes another change in the model, the process loops back to step 48 and the user's choices result in an updated visual model representation as well as an updated certification level.

When the user decides to finalise (as indicated by selection of an appropriate control on-screen), the process branches to step 66: the design is recorded as a "locked" design and the user's ability to interact with it is disabled. The locked design is saved under a user-chosen title in the user's account (or is referenced in a cookie stored on the user's PC if, for example, the user has not logged into the site). In alternative business models, the user may be able to download the finished design in an XML file or other suitable format.

After this point, the process is conventional. The design, incorporating the user's colour choices and any logo or other indicia uploaded by the user for the logo place holders, is converted to a cut-make-trim or CMT pattern for each size required, once the user places an order. The logo is checked for colour matching and stitching requirements, and the CMT is sent to the fabric cutting station. Assembly of the garment is also conventional Unlike in other apparent customisation systems, the user is not confined to the colour combinations of the designer for which certification has been received. Instead the user can change any panel to any available colour, with the result that the certification level is calculated and indicated to the user. Once the user is happy with and has finalised this unique design, it does not require re-certification, even though the certifying authority may never have seen the design chosen by the user. The system moves the certification process from a scenario where the final locked design is certified to one in which the criteria and the template are certified irrespective of the actual colour choices in the final garment.

The invention is not limited to the embodiments described herein but can be amended or modified without departing from the scope of the present invention.

The invention claimed is:

1. A computer implemented method of garment design having certification based on the visibility characteristics of the garment, the method comprising:
   (a) obtaining a garment template, said garment template comprising a plurality of individual panels which when assembled together contribute to an overall garment, each panel having an associated area, said garment template including at least one constraint selected from: a constraint requiring at least two of said plurality of panels to have a common visibility value, and a constraint on a maximum area of a specified one or more of said panels which may be overlaid with or replaced by indicia;
   (b) obtaining a set of calculation rules associated with said garment template, said set of calculation rules operable to calculate a certification level for said garment template based on at least the area of each panel less the actual or maximum allowed area of any indicia overlaying or replacing said panel, and a value for a visibility characteristic chosen for said panel, and further operable to return no certification level in the event that said at least one constraint is breached;
   (c) providing a selection control which is operable to select at least one of a fabric selection and a colour selection for one or more of said panels, said selection determining a visibility value for said panel in said calculation rules;
   (d) calculating a certification level for said garment template using said set of calculation rules and said selection; and
   (e) generating a garment design based on said selection and having associated therewith said certification level.

2. The method of claim 1, wherein calculating further comprises the presenting said calculated certification level.

3. The method of claim 1 or claim 2, wherein the method comprises repeating steps (c) and (d) until a certification level desired by a user is obtained for said designed garment pattern.

4. The method of claim 1, wherein the method further comprises operating the selection control to adjust the area associated with one or more of said panels, and wherein said calculating step (d) is based on the adjusted area selection.

5. The method of claim 1, wherein step (c) further comprises the step of providing to said user an indicia control which is operable to select indicia to be displayed on at least one of said panels, and wherein said calculating step (d) is based on the area associated with said panels less the area of said panels obscured by said indicia.

6. The method of claim 1, wherein said set of calculation rules are based on the area of each panel less manufacturing tolerances.

7. The method of claim 1, wherein the method further comprises the following step:
   (f) storing in memory said finalised garment pattern.

8. The method of claim 1, wherein said method comprises designating at least one first panel of said plurality of individual panels as linked to at least one second panel of said plurality of individual panels, and wherein a user selection made to either said first panel or said second panel causes a corresponding selection applied to the other linked panel.

9. Non-transitoy computer readable medium comprising a set of instructions which, when executed on a computer, are operable to:
- (a) obtain a garment template, said garment template comprising a plurality of individual panels which when assembled together contribute to an overall garment, each panel having an associated area, said garment template including at least one constraint selected from: a constraint requiring at least two of said plurality of panels to have a common visibility value, and a constraint on a maximum area of a specified one or more of said panels which may be overlaid with or replaced by indicia;
- (b) obtain a set of calculation rules associated with said garment template, said set of calculation rules operable to calculate a certification level for said garment template based on at least the area of each panel less the actual or maximum allowed area of any indicia overlaying or replacing said panel, and a value for a visibility characteristic chosen for said panel, and further operable to return no certification level in the event that said at least one constraint is breached;
- (c) provide a selection control which is operable to select at least one of a fabric selection and a colour selection for one or more of said panels, said selection determining a visibility value for said panel in said calculation rules;
- (d) calculate a certification level for said garment pattern using said set of calculation rules and said selection; and
- (e) generate a garment pattern based on said selection and having associated therewith said certification level.

* * * * *